W. H. THOMAS.
WAVE MOTOR.
APPLICATION FILED OCT. 21, 1912.

1,072,272.

Patented Sept. 2, 1913.

Witnesses

William H. Thomas
Inventor,
by C. A. Snow & Co.
Attorneys

UNITED STATES PATENT OFFICE.

WILLIAM H. THOMAS, OF ONTARIO, CALIFORNIA.

WAVE-MOTOR.

1,072,272. Specification of Letters Patent. Patented Sept. 2, 1913.

Application filed October 21, 1912. Serial No. 727,029.

*To all whom it may concern:*

Be it known that I, WILLIAM H. THOMAS, a citizen of the United States, residing at Ontario, in the county of San Bernardino and State of California, have invented a new and useful Wave-Motor, of which the following is a specification.

This invention relates to wave motors, its object being to utilize the power produced by the wave motion, for elevating water to a suitable reservoir from which it can be withdrawn for the purpose of driving a turbine or the like.

A further object is to provide improved means designed to be acted upon directly by the moving body of water.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

Figure 1:
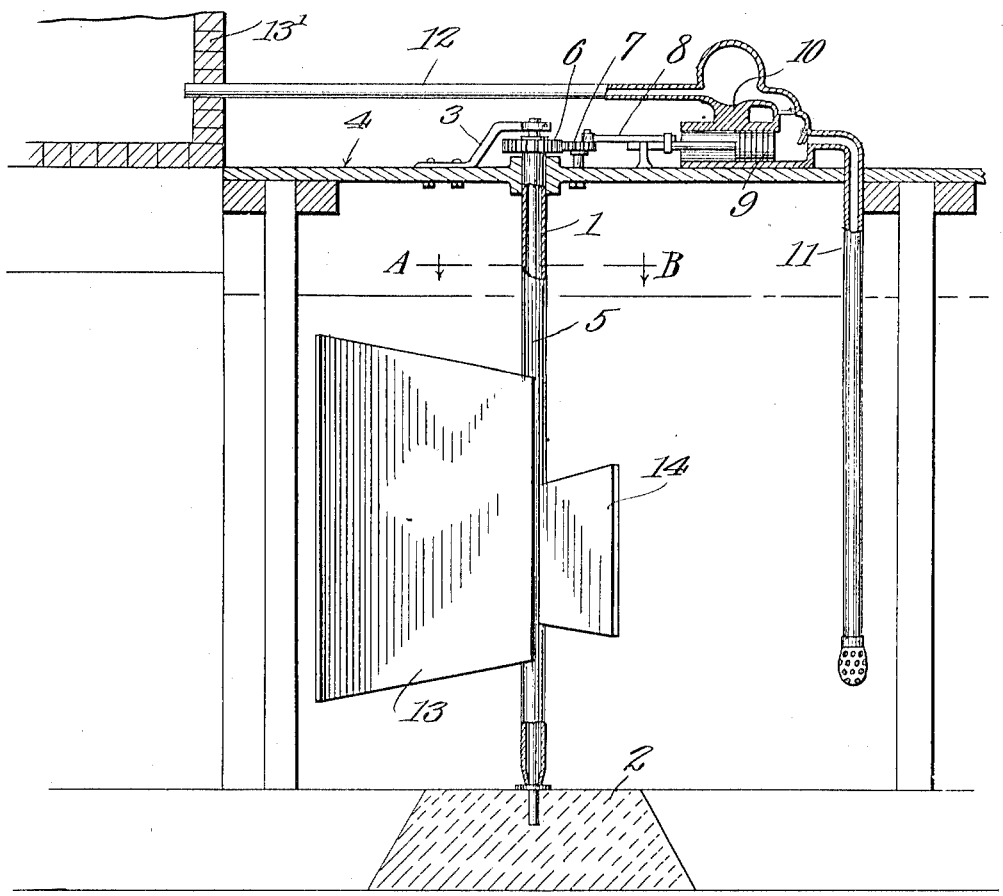
Figure 2:
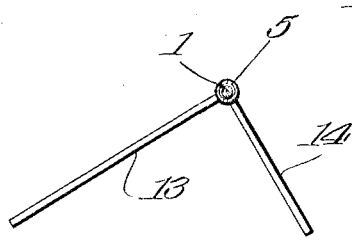

In the accompanying drawings the preferred form of the invention has been shown. In said drawings:—Figure 1 is a view partly in section and partly in elevation of the motor. Fig. 2 is a section on line A—B Fig. 1.

Referring to the figures by characters of reference 1 designates a shaft fixedly mounted at one end upon a base 2 designed to be submerged and mounted, at its upper end, within a bracket 3 or the like mounted on a structure 4 located above the surface of the water. A tubular shaft 5 is mounted for rotation upon the shaft 1 and is provided, near its upper end, with a large gear 6 which, in turn, meshes with a smaller gear 7. A pitman 8 is connected to and actuated by gear 7 and is adapted to drive the piston 9 of a pump 10. This pump has an intake pipe 11 extending into the casing thereof from a point below the surface of the water and an outflow pipe 12 extends from the pump casing to a reservoir 13' or the like. The gears are so proportioned that one rotation of gear 6 will produce a number of rotations of the gear 7 and, consequently, a number of reciprocations of the piston 9.

Extending radially from the tubular shaft 5 is a blade 13 of such length as to extend from a point near the bed of the body of water up to a point above the surface of the water. One or more additional blades 14, which are considerably smaller than the blade 13, are extended radially from the shaft 5 and disposed preferably at about 90 degrees relative thereto. The blades 14 and 15 are rigid and are fixedly mounted on the tubular shaft 5 and, consequently, maintained at a fixed angle relative to each other.

It will be understood that the blade 14 will, by reason of the fact that it is disposed at a right angle to the blade 13, cause the blade 13 to assume a position oblique to the incoming wave and blade 13 will rotate about its axis until the effective area of the blade 14 opposed to the incoming wave equals that of blade 13 at which time the blades will be in a condition of equilibrium. If the return flow is of the same quantity the blades will remain in the above mentioned position or in a position of equilibrium. With any variation from the quantity of flow above referred to or any variation of the submergence of the blades, the effective areas of the two blades disposed to the force of the wave will vary and the blades move about their axis. Thus the shaft 5 to which the blades are secured will be rotated back and forth, motion being transmitted therefrom through the gears to the pump which, in turn, operates to elevate water and direct it into the reservoir 13'.

While the device is especially designed for elevating water to a reservoir, it will be obvious that it can also be employed for compressing air, and for other purposes.

What is claimed is:—

1. A wave motor including a shaft mounted for rotation about a vertical axis, blades radiating from the shaft and disposed at an angle to each other, one of said blades constituting means for holding the other blade normally obliquely to the path of movement of the waves, a pump, and means for transmitting motion to the pump from the shaft.

2. A wave motor including a shaft mounted for rotation about a vertical axis, radial blades extending from the shaft, one of said blades constituting means for holding the other blade normally in a position to receive the force of a wave upon one face thereof, thereby to rotate the shaft, a pump, and means actuated by the shaft when rotated, for actuating the pump.

3. A wave motor including a shaft mounted on end, blades of different areas radiating from the shaft, one of said blades constituting means for normally holding the other blade in position to receive the force of waves against one face thereof to rotate the shaft in one direction, a gear revoluble with the shaft, a pump including a piston, and speed multiplying means for transmitting motion from said gear to the piston.

4. A wave motor including a shaft mounted for rotation about a vertical axis, radial blades extending from the shaft, one of said blades constituting means for holding the other blade normally in a position to receive the force of a wave upon one face thereof thereby to rotate the shaft, one of said blades being of greater area than the other blade, and power transmitting means operated by the shaft.

In testimony that I claim the foregoing as my own, I have hereto affixed my signature in the presence of two witnesses.

WILLIAM H. THOMAS.

Witnesses:
  ARCHD. WALLACE,
  CHAS. F. PIERCE.

---

Copies of this patent may be obtained for five cents each, by addressing the "Commissioner of Patents, Washington, D. C."